(12) United States Patent
Kassner et al.

(10) Patent No.: US 11,188,211 B2
(45) Date of Patent: Nov. 30, 2021

(54) TRANSPORTATION VEHICLE WITH AN IMAGE CAPTURING UNIT AND AN OPERATING SYSTEM FOR OPERATING DEVICES OF THE TRANSPORTATION VEHICLE AND METHOD FOR OPERATING THE OPERATING SYSTEM

(71) Applicant: VOLKSWAGEN AKTIENGESELLSCHAFT, Wolfsburg (DE)

(72) Inventors: Astrid Kassner, Berlin (DE); Nils Kötter, Braunschweig (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 16/065,417

(22) PCT Filed: Dec. 20, 2016

(86) PCT No.: PCT/EP2016/082022
§ 371 (c)(1),
(2) Date: Jun. 22, 2018

(87) PCT Pub. No.: WO2017/108855
PCT Pub. Date: Jun. 29, 2017

(65) Prior Publication Data
US 2019/0004693 A1 Jan. 3, 2019

(30) Foreign Application Priority Data
Dec. 22, 2015 (DE) ..................... 10 2015 122 602.2

(51) Int. Cl.
*G06F 3/0484* (2013.01)
*B60K 37/06* (2006.01)
(Continued)

(52) U.S. Cl.
CPC .......... *G06F 3/04847* (2013.01); *B60K 37/06* (2013.01); *B60R 1/00* (2013.01);
(Continued)

(58) Field of Classification Search
CPC .................... G06F 3/04847; G06F 3/04883
See application file for complete search history.

(56) References Cited

U.S. PATENT DOCUMENTS 6,275,231 B1 * 8/2001 Obradovich ........ B60R 16/0231
345/156
8,332,093 B2 12/2012 Yamasaki et al.
(Continued)

FOREIGN PATENT DOCUMENTS

| CN | 101808843 A | 8/2010 |
|---|---|---|
| CN | 102159419 A | 8/2011 |

(Continued)

OTHER PUBLICATIONS

Search Report for International Patent Application No. PCT/EP2016/082022; dated Apr. 10, 2017.

*Primary Examiner* — William L Bashore
*Assistant Examiner* — Gregory A Distefano
(74) *Attorney, Agent, or Firm* — Barnes & Thornburg LLP

(57) ABSTRACT

Transportation vehicle with an image capturing unit, at least one first and one second device, and an operating system for operating the devices. The operating system includes a detection unit, by which at least one first or one second driving state of the transportation vehicle is detected at a point in time, and a control unit coupled to the detection unit and by which the first or second device are selected depending on the detected driving state and a graphic user interface is generated for the selected device. Also disclosed is an input and output unit coupled to the control unit and having (Continued)

a display surface with at least one first and one second area. The generated graphic user interface for the selected device is output by the first area of the display surface, wherein the first area has a touch-sensitive surface by which a user input is detected.

17 Claims, 4 Drawing Sheets

(51) Int. Cl.
*B60R 1/00* (2006.01)
*B60R 1/06* (2006.01)
*B60R 1/12* (2006.01)
*G06F 3/0488* (2013.01)

(52) U.S. Cl.
CPC .............. *B60R 1/06* (2013.01); *B60R 1/12* (2013.01); *G06F 3/04883* (2013.01); *B60K 2370/195* (2019.05); *B60R 2001/1215* (2013.01)

(56) References Cited

U.S. PATENT DOCUMENTS

| | | | |
|---|---|---|---|
| 8,416,219 B2 | 4/2013 | Kawachi | |
| 2006/0073796 A1* | 4/2006 | Collavo | H04M 1/6091 455/116 |
| 2007/0057816 A1* | 3/2007 | Sakakibara | B62D 15/027 340/932.2 |
| 2009/0112389 A1* | 4/2009 | Yamamoto | B60R 1/00 701/31.4 |
| 2010/0079413 A1 | 4/2010 | Kawashima et al. | |
| 2010/0201896 A1* | 8/2010 | Ostreko | B60R 1/12 349/1 |
| 2011/0267184 A1* | 11/2011 | Lee | B60Q 9/005 340/435 |
| 2014/0267688 A1 | 9/2014 | Aich et al. | |
| 2015/0070319 A1* | 3/2015 | Pryor | G06F 3/0425 345/175 |
| 2015/0178034 A1* | 6/2015 | Penilla | G06Q 20/18 345/1.1 |
| 2015/0274016 A1* | 10/2015 | Kinoshita | G06F 3/04842 701/36 |
| 2016/0077652 A1* | 3/2016 | Yang | B60K 37/06 345/174 |
| 2016/0096509 A1* | 4/2016 | Ette | B60R 25/305 382/103 |
| 2016/0303968 A1* | 10/2016 | Miller | B60K 35/00 |
| 2017/0349098 A1* | 12/2017 | Uhm | B60K 35/00 |

FOREIGN PATENT DOCUMENTS

| | | |
|---|---|---|
| CN | 103129464 A | 6/2013 |
| DE | 102012010044 A1 | 11/2013 |
| JP | 2005153684 A * | 6/2005 |

* cited by examiner

TRANSPORTATION VEHICLE WITH AN IMAGE CAPTURING UNIT AND AN OPERATING SYSTEM FOR OPERATING DEVICES OF THE TRANSPORTATION VEHICLE AND METHOD FOR OPERATING THE OPERATING SYSTEM

PRIORITY CLAIM

This patent application is a U.S. National Phase of International Patent Application No. PCT/EP2016/082022, filed 20 Dec. 2016, which claims priority to German Patent Application No. 10 2015 122 602.2, filed 22 Dec. 2015, the disclosures of which are incorporated herein by reference in their entireties.

SUMMARY

Illustrative embodiments relate to a transportation vehicle having an image capturing unit, at least one first and one second device, as well as an operating system for operating the devices. Illustrative embodiments further relate to a method for operating an operating system for operating at least one first and one second device of a transportation vehicle.

BRIEF DESCRIPTION OF THE DRAWINGS

Disclosed embodiments are now explained with reference to the drawings, in which.

DETAILED DESCRIPTION

Figure 1:
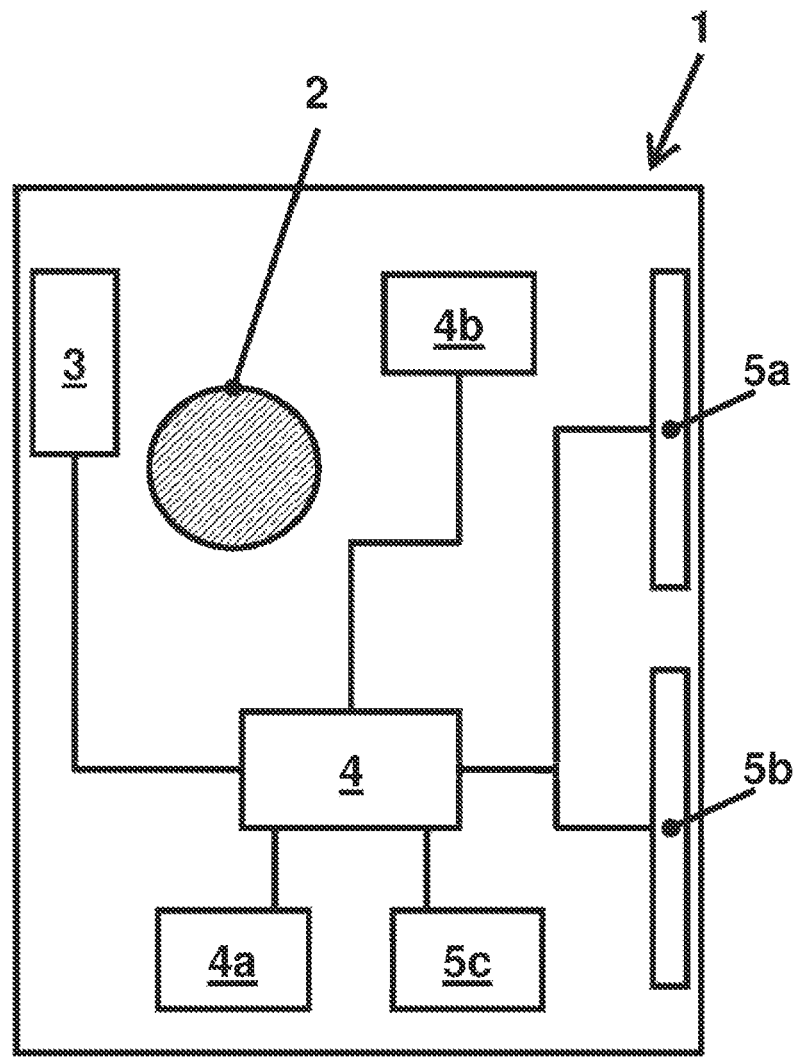
FIG. 1 shows an exemplary embodiment of the transportation vehicle.

In a transportation vehicle, a plurality of electronic devices are provided, the operation whereof must be made possible for the driver or another transportation vehicle occupant. These devices include, for example, a navigation system, a plurality of driver assistance systems, as well as communication and multimedia applications, which for example, include a telephone system and devices for playing back multimedia contents, for example, a radio or a CD player.

To be able to operate various devices in the transportation vehicle, in many cases multifunction operating systems are used in transportation vehicles, which comprise one or more function displays and operating elements, by which the various devices of the transportation vehicle can be operated. The operation is assisted or guided by the information reproduced on the function display. Furthermore, it can be selected via the operating system which information should be displayed on the multifunction display.

It is of importance in transportation vehicles that operation can be accomplished easily, rapidly, and intuitively. In this way, it is ensured that the user, in particular, the driver, need pay as little attention as possible to the operation. This should be taken into account in the design of the function display as well as the arrangement of operating elements inside the transportation vehicle. Since in many cases the complexity of flexible function displays, possibly with a touchscreen, results in complex user interfaces, typically specific functions in transportation vehicles are further implemented by analog switches and controllers, wherein individual functions are assigned a fixed position in the transportation vehicle.

U.S. Pat. No. 8,332,093 B2 describes a virtual user interface for a transportation vehicle, wherein a representation of the transportation vehicle is shown on a screen, wherein this view can possibly be changed by rotation. Control panels can be displayed, as a result of the actuation of which an actuator is operated, possibly to open a door.

Disclosed embodiments provide a transportation vehicle and a method of the type mentioned initially, which allow a rapid and easy operation of devices in a transportation vehicle.

The disclosed transportation vehicle comprises an image capturing unit, at least one first and one second device, as well as an operating system for operating the devices. Here the operating system comprises a detection unit, by which at least one first or one second driving state of the transportation vehicle can be detected at a point in time. The operating system further comprises a control unit, which is coupled to the detection unit and by which the first or second device can be selected depending on the detected driving state and a graphic user interface can be generated for the selected device. The operating system further comprises an output and input unit, which is coupled to the control unit and which comprises a display surface having at least one first and one second area. In this case, the generated graphic user interface for the selected device can be output by the first area of the display surface, wherein the first area has a touch-sensitive surface, by which a user input can be detected. Image data of the image capturing unit of the transportation vehicle can be displayed by the second area of the display surface. In this case, based on the detected user input, a control signal can be generated and can be transferred to the selected device of the transportation vehicle.

An output and input unit can be used by the disclosed method depending on a driving state in a context-sensitive manner for various devices. In addition, an efficient use of the components for different functions can be achieved. The complexity of the user-displayed operation can further be reduced, with the result that less attentiveness of the user is claimed. The output and input unit can further be used simultaneously for the display of image data of an image capturing unit by dividing into two areas and outputting a situation-related user interface.

The detection unit can detect the driving state by various parameters of the transportation vehicle, for example, the speed, acceleration, position, and/or an operating mode of the transportation vehicle. The driving state can furthermore be detected by a user input. The user can, for example, switch manually between various driving states. By the detected driving state, it is determined which device of the transportation vehicle should be selected. It can be taken into account here that in different driving states, specific devices of the transportation vehicle should be able to be operated, for example, the doors in the case of a parking transportation vehicle or a lighting device during travel of the transportation vehicle. For operation of the selected device, a user interface is generated and output by the input and output device.

A "user interface" is understood as a man-machine interface. A graphic user interface is provided which comprises graphic objects and which is displayed by a display device. The graphic objects of the graphic user interface can be operated and/or serve as the information display. Objects which can be operated can be selected and actuated, wherein a function assigned to the object which can be operated is executed. For example, the information display can be varied, furthermore user inputs for the devices of the transportation vehicle assigned to the objects can be detected. Furthermore, further inputs can be detected, possibly by an input field for an input of text or other symbols. The operation of the user interface is made by methods known per se, possibly by a touchscreen, a push and rotary switch, a mouse, or a touchpad, or another input methods. Operation can further be accomplished by gestures or voice control.

The output of the user interface is made by the output and input unit in a first area of the output and input unit. This first area has a touch-sensitive surface, by which user inputs can be detected. The user inputs can further be input by other input methods, for example, by a push and rotary switch, a mouse, or a touchpad. The display surface of the output and input unit further comprises a second area, by which image data of an image capturing unit of the transportation vehicle can be displayed. The image data can be detected in a manner known per se, for example, by a camera system.

The selected device can now be controlled by the detected user input, wherein a control signal is generated and transmitted to the device.

In at least one disclosed embodiment of the transportation vehicle, the graphic user interface comprises operating elements and the user input can be detected by an operating gesture executed with an actuating object, in particular, a tapping gesture or a swiping gesture. The operating gesture can be executed by at least one of the operating elements. As a result, an operation of the user interface entrusted to the user can be achieved to operate the selected device of the transportation vehicle.

When executing an operating gesture by an operating element, methods known per se can be used, for example, by tapping on the touch-sensitive surface at a position which is assigned to an operating element, this operating element is selected or by executing a displacement of an operating object by the initial and end position of a swiping gesture.

In a further disclosed embodiment, the output and input unit is disposed in an interior of the transportation vehicle in an outer region on the driver side. The output and input unit can thus easily be reached for the driver and can be operated conveniently.

In a further development, at least one of the devices is disposed relative to the driver on the same side as the output and input unit. This allows a spatial assignment of the output and input unit to the device of the transportation vehicle. The user intuitively identifies that a user input operates a device in direct spatial relationship with the output and input unit. The spatial relationship can in this case consist in a particular spatial proximity between the output and input unit and the device but also in the arrangement of the device relative to the driver.

In at least one disclosed embodiment at least one of the devices comprises an actuator. This way, actuators of the transportation vehicle can be controlled by the output and input unit. By actuators in the sense of the disclosure, physical quantities are varied by an electrical controller, for example, a mechanical movement is performed, possibly at a door and flap opening or a window lever.

In a further disclosed embodiment, when the transportation vehicle is traveling, the first driving state is detected and when the transportation vehicle is stationary, the second driving state is detected. As a result, basic transportation vehicle states can be distinguished. The selection of the device of the transportation vehicle by the driving state can thus be made so that a device is selected in a context-sensitive manner which should be operated with a high probability in the respective driving state.

In a further development, the device, which can be selected in the second driving state, comprises a transportation vehicle door. The transportation vehicle door comprises a device for opening and closing. As a result, the transportation vehicle door can be operated, for example, when the transportation vehicle is stationary.

In a further disclosed embodiment, if the selected device comprises the transportation vehicle door, the user input comprises a movement direction and the transportation vehicle door can be controlled depending on the movement direction. The user input comprises a swiping gesture. As a result, the transportation vehicle door can be controlled by a simple user input.

In a further development, the device, which can be selected in the first driving state, comprises a lighting device of the transportation vehicle. The device comprises an ambient lighting. As a result, for example, when the transportation vehicle is traveling, a lighting can be controlled, in particular, an ambient or interior lighting.

In at least one disclosed embodiment the image capturing unit of the transportation vehicle comprises a digital outer mirror. This way, a display can be provided by the second area, which provides image data of the digital outer mirror to the user. The digital outer mirror can comprise a camera device, by which image data in a surroundings of the transportation vehicle are captured, in particular, in a lateral surroundings of the transportation vehicle.

In a further disclosed embodiment the graphic user interface comprises static operating elements and the static operating elements can be generated independently of the detected transportation vehicle state. This way, operating elements can be displayed which are of interest to the user independently of the driving state, for example, operating elements to control a headlamp system of the transportation vehicle.

In a further development, a headlamp device of the transportation vehicle can be operated by the static operating elements. Thus, functions which are typically arranged as physical switching elements in the area of the driver can be operated by the output and input unit. This enables flexibility and a reduction in the operating elements to be operated.

In the method of the type mentioned initially, the transportation vehicle further comprises an image capturing unit and an output and input unit, wherein the output and input unit comprises a display surface with at least one first and one second area. In this case, the first area has a touch-sensitive surface. At one time point, at least one first or one second driving state of the transportation vehicle is detected. Depending on the detected driving state the first or second device is selected and a graphic user interface is generated for the selected device. In this case, the generated graphic user interface for the selected device is output by the first area of the display surface and a user input is detected by the touch-sensitive surface of the first area. Image data of the image capturing unit of the transportation vehicle are displayed by the second area of the display surface. In this case, a control signal is generated by the detected user input and is transmitted to the selected device of the transportation vehicle.

The disclosed transportation vehicle is configured to implement the disclosed method. The method thus has the same benefits as the disclosed transportation vehicle.

In at least one disclosed embodiment of the method, image data of a digital outer mirror of the transportation vehicle are detected by the image capturing unit of the transportation vehicle. Therefore, relevant image data for the driver are output in the second area of the display surface.

In a further disclosed embodiment the selected device comprises a transportation vehicle door and the user input comprises a movement direction, wherein the transportation vehicle door is controlled depending on the movement direction. As a result, the output and input unit can be used to control the transportation vehicle door.

Furthermore, a user input can be detected and the driving state can be detected by the user input. For example, it can be provided that switching between different driving states is carried out by a user input. As a result, the user can manually adjust the driving state and possibly influence the formation of the user interface.

An exemplary embodiment of the disclosed transportation vehicle is explained with reference to FIG. 1.

In a transportation vehicle 1 a driver 2 is located on a transportation vehicle seat arranged on the front left in the transportation vehicle 1. In further exemplary embodiments the driver 2 can be located at different positions in the transportation vehicle 1 depending on traffic law conditions.

The transportation vehicle 1 comprises a control unit 4, to which an output and input unit 3 is coupled. The output and input unit 3 is arranged on the left side next to the position of the transportation vehicle seat on which the driver 2 of the transportation vehicle 1 is located. The position at which the output and input unit 3 is arranged can vary but a position in an outer region on the driver's side of the transportation vehicle 1 is provided, wherein the driver's side is determined by traffic law conditions. In the exemplary embodiment shown the output and input unit 3 is located at the bottom left relative to a steering wheel arranged in front of the driver 2 in the transportation vehicle 1.

Furthermore, a detection unit 4a and an image capturing unit 4b is coupled to the control unit 4. In the example shown, the image capturing unit 4b comprises a digital outer mirror 4b. Image data laterally next to the transportation vehicle are detected by the digital outer mirror 4b and transmitted to the control unit 4, wherein the image data comprise an area of the driver's side and a rearward area relative to the transportation vehicle 1.

Furthermore devices 5a, 5b, 5c are coupled to the control unit 4, in particular, two transportation vehicle doors 5a and 5b and a lighting device 5c, in the example shown an ambient lighting 5c. The devices 5a, 5b, 5c of the transportation vehicle 1 can alternatively or additionally comprise other devices of the transportation vehicle 1, which have an interface to operate the respective device 5a, 5b, 5c. An exemplary embodiment of the disclosed method is explained by reference to FIGS. 1 and 2. The disclosed system explained above with reference to FIG. 1 is taken as the starting point.

At a point in time it is detected by the detection unit 4a whether the transportation vehicle 1 is located in a first or in a second driving state. In the exemplary embodiment the first driving state is detected when the transportation vehicle is travelling. The second driving state is detected when the transportation vehicle is stationary. In further exemplary embodiments, the driving states can be differently defined or more than two driving states can be defined. The driving state of the transportation vehicle 1 is detected by parameters of the transportation vehicle 1, for example, by the speed, the position, and/or an acceleration of the transportation vehicle 1. The driving states can furthermore be detected by a user input, for example, the user can switch over between different driving states by actuating an actuating object.

A device 5a, 5b, 5c is now selected depending on the detected driving state. For this selected device 5a, 5b, 5c a graphic user interface is generated and transmitted to the output and input unit 3. The output of the graphic user interface is made by the output and input unit 3 in a first area 7a of a display surface 6 of the output and input unit 3. In this case, the display surface 6 further comprises a second area 7b in which in the exemplary embodiment shown, image data are output which have been detected by the digital outer mirror 4b.

The output and input unit 3 has a touch-sensitive surface in the first area 7a of the display surface 6. A so-called touchscreen is thus provided. For example, a film can be arranged above the display surface 6 by which the position of a contact of an actuating object can be detected. The actuating object comprises the fingertip of a user. The film can, for example, be configured as a resistive touch film, capacitive touch film, or piezoelectric film. Furthermore, the film can be configured so that a heat current, which emanates for example, from the fingertip of a user, is measured. Various inputs can be obtained from the temporal development of the contact of the film.

For example, in the simplest case, the contact of the film at a specific position can be detected and assigned to a graphic object displayed on the display surface 6, for example, an operating object of the graphic user interface. Furthermore, the duration of the contact at a specific position or within a specific area can be detected. Furthermore, gestures can be detected, wherein the time behavior of the position of a persistent contact of the touch-sensitive surface is detected and evaluated.

Figure 2:
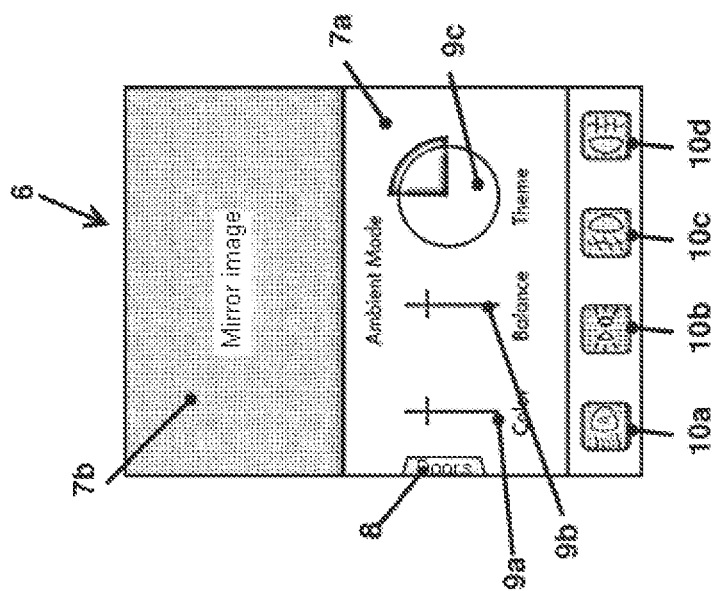
FIG. 2 shows an exemplary embodiment of a display generated in the method.

An exemplary embodiment of a display generated in the disclosed method is shown with reference to FIG. 2. The disclosed transportation vehicle 1 explained above with reference to FIG. 1 is assumed here.

In the case shown in FIG. 2, the first driving state of the transportation vehicle 1 was detected, that is, the transportation vehicle 1 travels in a straight line. In this exemplary embodiment, this first driving state is assigned the ambient lighting 5c as the device of the transportation vehicle 1. A graphic user interface is therefore generated for the ambient lighting 5c and output in the first area 7a of the display surface 6. The graphic user interface comprises operating elements 9a, 9b, 9c, in the example shown a color regulator 9a, a balance regulator 9b, and an element 9c for selecting a pre-setting. Now a user input is detected, in particular, the driver 2 touches the touchscreen in the first area 7a at a certain position and a function of the ambient lighting 9c is executed by the position and the operating elements 9a, 9b, 9c.

In the exemplary embodiment shown the first area 7a further comprises static operating elements 10a to 10d for controlling headlamps of the transportation vehicle 1. The static operating elements 10a to 10d are displayed independently of the detected driving state, here for example, at the lower edge of the display surface 6. The static operating elements 10a to 10d replace analog switching elements or switching elements arranged physically at fixed positions in the transportation vehicle. In a further exemplary embodiment the static operating elements 10a to 10d are merely displayed in a driving state or in a subset of several driving states in the graphic user interface.

The graphic user interface further comprises a switching surface 8 with the inscription "doors". This switching surface in the exemplary embodiment allows a user input by which the detected driving state can be varied.

In the second area 7b of the display surface 6, an output of image data is made independently of the driving state. In the exemplary embodiment this is an output of the digital outer mirror 4b. The output of this image data is safety-relevant and should not be varied in this case. In further exemplary embodiments it can however be provided that here also a display dependent on the driving state is generated.

Figure 3:
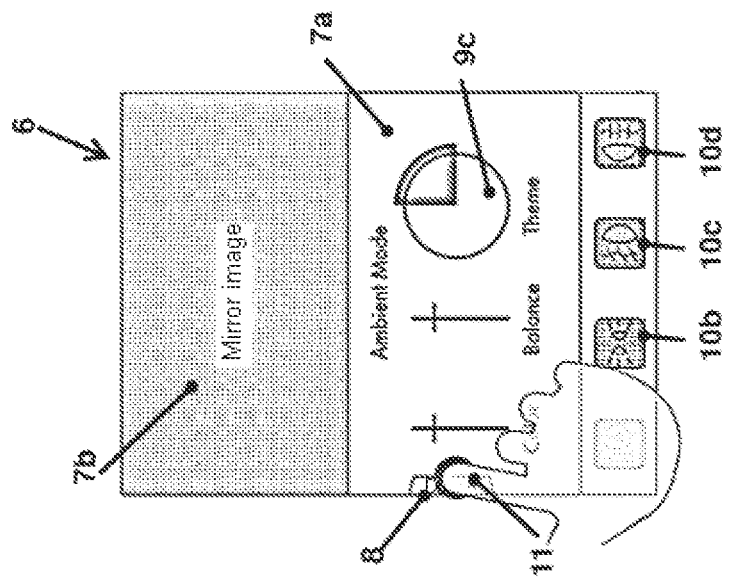
FIG. 3 shows the recording of the driving state by a user input.

With reference to FIG. 3, the detection of the driving state is explained by a user input. The disclosed system and method explained above with reference to FIGS. 1 and 2 is assumed here.

In the case shown in FIG. 3 the disclosed method was executed as already explained above and a graphic user interface for the ambient lighting 5c of the transportation vehicle 1 is shown. The driver 2 now actuates with the finger of his hand 11 the switching surface 8 in the first area 7a of the display surface 6 of the output and input unit 3. This contact is detected and a signal is generated, by which a different driving state is activated, in the example shown the second driving state, which is normally detected when the transportation vehicle 1 is stationary.

Figure 4A:
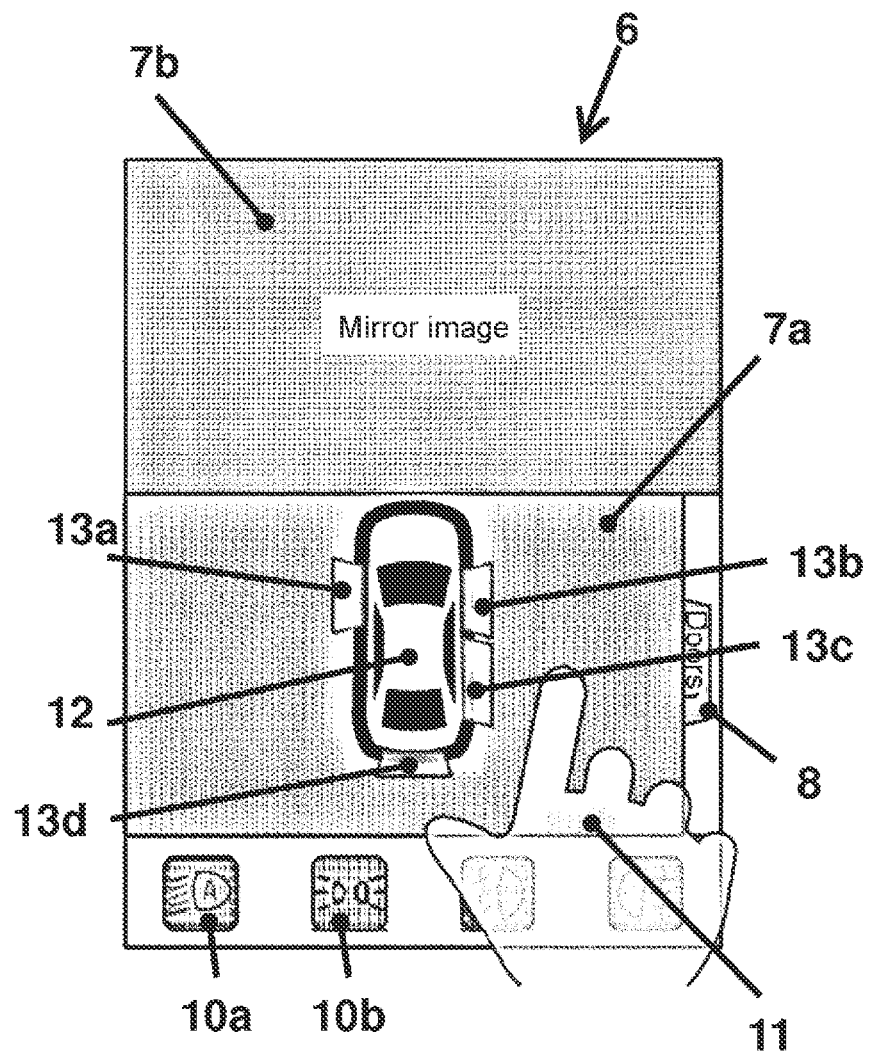
FIGS. 4A to 4C show an operation for the method.
Figure 4C:
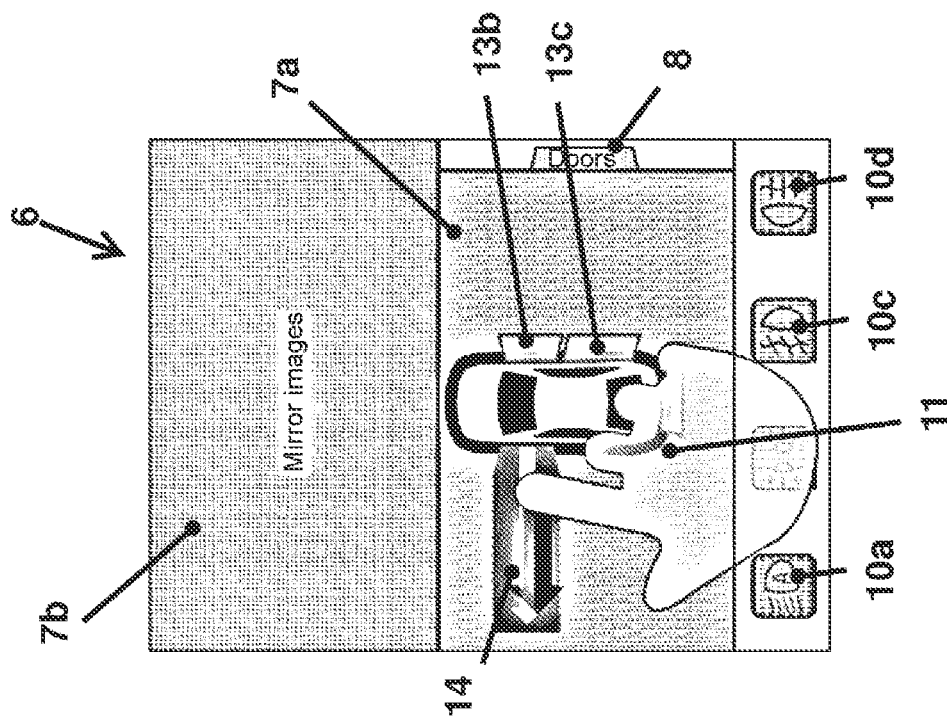
Figure 4B:
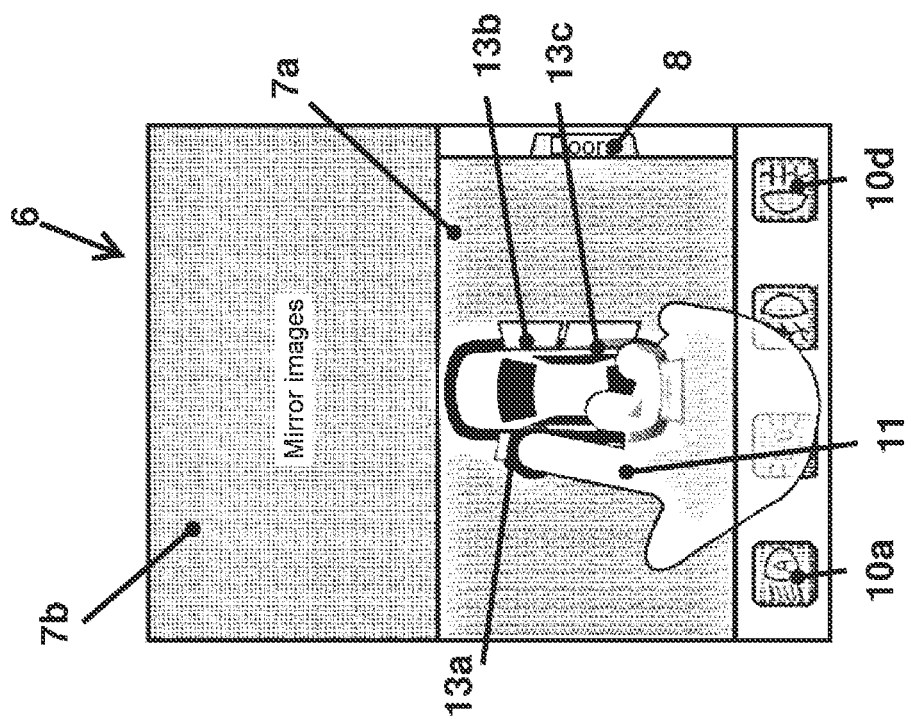

With reference to FIGS. 4A to 4C, an operation of the disclosed transportation vehicle 1 is shown. The disclosed transportation vehicle 1 and method shown above with reference to FIGS. 1 to 3 are assumed here.

In the case shown the second driving mode was detected, that is, the transportation vehicle 1 is located in the stationary state or the second driving mode was detected by a user input. In this case, the graphic user interface is generated so that the transportation vehicle doors 5a and 5b can be operated by this. In the example shown further doors and the trunk flap can furthermore be operated. To this end the graphic user interface comprises a transportation vehicle representation 12 on which operating elements 13a to 13d are also arranged, wherein the spatial arrangement of the operating elements 13a to 13d corresponds to the spatial arrangement of the transportation vehicle doors 5a, 5b.

The graphic user interface further comprises, as in the case explained with reference to FIGS. 2 and 3, the static operating elements 10a-10d for the headlamps of the transportation vehicle 1.

By touching an operating element 13a-d of the graphic user interface with a finger of the hand 11, the driver 2 can select a transportation vehicle door 5a, 5b to be operated. By using a swiping gesture, here along the arrow 14 shown in FIG. 4C, the user can open the selected transportation vehicle door 5a, 5b. The operating gesture 14 for opening the door comprises in this example a drawing of the transportation vehicle representation 12 away from the original position of the operating element 13a shown in FIG. 4B. Similarly to this, a closing of a door can be accomplished by a movement substantially in the inverse direction of the arrow 14, that is by a swiping gesture towards the transportation vehicle.

In further exemplary embodiments other devices 5a, 5b, 5c of the transportation vehicle 1 can be controlled by the graphic user interface, wherein in particular devices with spatial reference to the arrangement of the output and input unit 3 in the transportation vehicle can be controlled, for example, an outer mirror on the corresponding side. The spatial reference to the device 5a, 5b, 5c to be controlled can also be produced whereby in conventional transportation vehicles the corresponding device 5a, 5b, 5c can typically be operated in an area outside on the driver's side. For example, the driver 2 is typically familiar with the fact that functions of the headlamps of the transportation vehicle 1 can be controlled by an operating element on the instrument panel on the left next to the steering wheel. In this case, the driver 2 intuitively makes a spatial assignment to the devices 5a, 5b, 5c which can be operated and can locate the corresponding operating possibilities at the output and input unit 3 on the same side of the transportation vehicle 1.

Furthermore, the switching between the various driving states of the transportation vehicle 1 in further exemplary embodiments can be accomplished in a different way and by different parameters of the transportation vehicle. The at least one device 5a, 5b, 5c of the transportation vehicle 1 which can be operated in one driving state is selected by the driving state so that relevant devices 5a, 5b, 5c of the transportation vehicle 1 can be operated by the output and input unit 3, wherein at the same time a too-complex display of non-relevant devices 5a, 5b, 5c is avoided.

In the exemplary embodiment shown the graphic user interface further comprises the switching surface 8 with the inscription "doors", wherein by actuating the switching surface 8 in this case the driving mode can be switched over to the first driving mode. In this case, a display is again generated such as is shown for example, in FIGS. 2 and 3.

In a further example, the change of the driving mode can be made by a user input merely for a subset of the driving states of the transportation vehicle 1. It can thereby be avoided that safety-relevant restrictions of the operability are varied by a user input in specific driving states.

LIST OF REFERENCES

1 Transportation vehicle
2 Driver
3 Output and input unit
4 Control unit
4a Detection unit
4b Image capturing unit; digital outer mirror
5a, 5b Transportation vehicle doors
5c Lighting device; ambient lighting
6 Display surface
7a First area
7b Second area; outer mirror display
8 Switching surface "doors"
9a, 9b, 9c Operating elements "ambient lighting"
10a, 10b, 10c, 10d Static operating elements "light"
11 Hand
12 Transportation vehicle representation
13a, 13b, 13c, 13d Operating elements "flap opening"
14 Arrow, operating gesture

The invention claimed is:

1. A transportation vehicle comprising:
an image capturing unit;
a plurality of devices;
an operating control system for controlling operation of the plurality of devices,
wherein the operating control system comprises an output and input unit that includes a display surface having first and second areas,
wherein the output and input unit is disposed in an interior of the transportation vehicle, laterally proximate to a driver on the driver side of the interior and within the driver's view achievable with eye movement but without requiring head movement,
wherein the first area of the display surface includes a touch-sensitive surface, and wherein the operating control system is configured to:
detect one of first and second driving states of the transportation vehicle, wherein the first driving state is the transportation vehicle moving and the second driving state is the transportation vehicle stationary;

display image data provided by the image capturing unit in the second area of the display surface, wherein the image data comprises digital mirror image data captured laterally exterior and next to the transportation vehicle on the driver side and viewed rearward, and wherein the image data displayed in the second area of the display surface is displayed independently of the detected driving state of the transportation vehicle; and generate, based on the detected driving state of the transportation vehicle, a graphic user interface for controlling one or more of the plurality of devices, wherein the generated graphic user interface is output in the first area of the display surface, wherein, during detection of the first driving state, selection and control of the one or more of the plurality of devices is enabled and performed in response to receiving user input of the driver on the touch-sensitive surface of the first area, wherein, based on the detected user input of the driver, a control signal is generated to control operation of the one or more of the plurality of devices of the transportation vehicle according to the detected user input.

2. The transportation vehicle of claim 1, wherein the graphic user interface generated and output in the first area comprises a plurality of operating elements, wherein the user input of the driver includes an operating gesture executed using an actuating object performed by the driver relative to at least one of the plurality of operating elements included in the displayed graphic user interface.

3. The transportation vehicle of claim 1, wherein at least one of the plurality of devices is disposed relative to the driver on a side most proximate to the output and input unit.

4. The transportation vehicle of claim 1, wherein at least one of the plurality of devices comprises an actuator.

5. The transportation vehicle of claim 1, wherein the one or more of the plurality of devices are selectable and controllable during detection of the second driving state, wherein the plurality of devices comprises a transportation vehicle door.

6. The transportation vehicle of claim 5, wherein the user input comprises a movement direction of a driver's operating gesture and the transportation vehicle door is controlled depending on the movement direction of the driver's operating gesture.

7. The transportation vehicle of claim 1, wherein the one or more of the plurality of devices, selectable and controllable in the first driving state, comprises a lighting device of the transportation vehicle.

8. The transportation vehicle of claim 1, wherein the image capturing unit of the transportation vehicle comprises a digital outer mirror.

9. The transportation vehicle of claim 1, wherein the graphic user interface comprises static operating elements and the static operating elements are generated independently of the detected transportation vehicle state.

10. The transportation vehicle of claim 8, wherein a headlamp device of the transportation vehicle is operated by the static operating elements.

11. A method for controlling, by an operating control system, a plurality of devices of a transportation vehicle, the plurality of devices including an image capturing unit and an output and input unit, the output and input unit including a display surface having first and second areas, the output and input unit disposed in an interior of the transportation vehicle, laterally proximate to a driver on the driver side of the interior and within the driver's view achievable with eye movement but without requiring head movement, the first area of the display surface including a touch-sensitive surface, the method comprising:

detecting, by the operating control system, one of first and second driving states of the transportation vehicle, wherein the first driving state is the transportation vehicle moving and the second driving state is the transportation vehicle stationary;

displaying image data provided by the image capturing unit in the second area of the display surface, wherein the image data comprises digital mirror image data captured laterally exterior and next to the transportation vehicle on the driver side and viewed rearward, and wherein the image data displayed in the second area of the display surface is displayed independently of the detected driving state of the transportation vehicle; and generating, based on the detected driving state of the transportation vehicle, a graphic user interface for controlling one or more of the plurality of devices of the transportation vehicle, wherein the generated graphic user interface is output in the first area of the display surface, wherein, during detection of the first driving state, selection and control of the one or more of the plurality of devices is enabled and performed in response to receiving user input of the driver on the the touch-sensitive surface of the first area;

generating, based on the detected user input of the driver, a control signal to control operation of the one or more of the plurality of devices of the transportation vehicle according to the detected user input.

12. The method of claim 11, wherein the one or more of the plurality of devices comprises a transportation vehicle door, and wherein the user input comprises a movement direction of a driver's operating gesture and the transportation vehicle door is controlled depending on the movement direction of the driver's operating gesture.

13. The method of claim 11, wherein the graphic user interface generated and output in the first area comprises a plurality of operating elements, wherein the user input of the driver includes an operating gesture executed using an actuating object performed by the driver relative to at least one of the plurality of operating elements included in the displayed graphic user interface.

14. The method of claim 11, wherein the one or more of the plurality of devices are selectable and controllable during detection of the second driving state, wherein the plurality of devices comprises a transportation vehicle door, and wherein the user input comprises a movement direction of a driver's operating gesture and the transportation vehicle door is controlled depending on the movement direction of the driver's operating gesture.

15. The method of claim 11, wherein the one or more of the plurality of devices, selectable and controllable in the first driving state, comprises a lighting device of the transportation vehicle.

16. The method of claim 11, wherein the graphic user interface comprises static operating elements generated independently of the detected transportation vehicle state.

17. The method of claim 16, wherein a headlamp device of the transportation vehicle is operated by the static operating elements.

* * * * *